Figure 1:
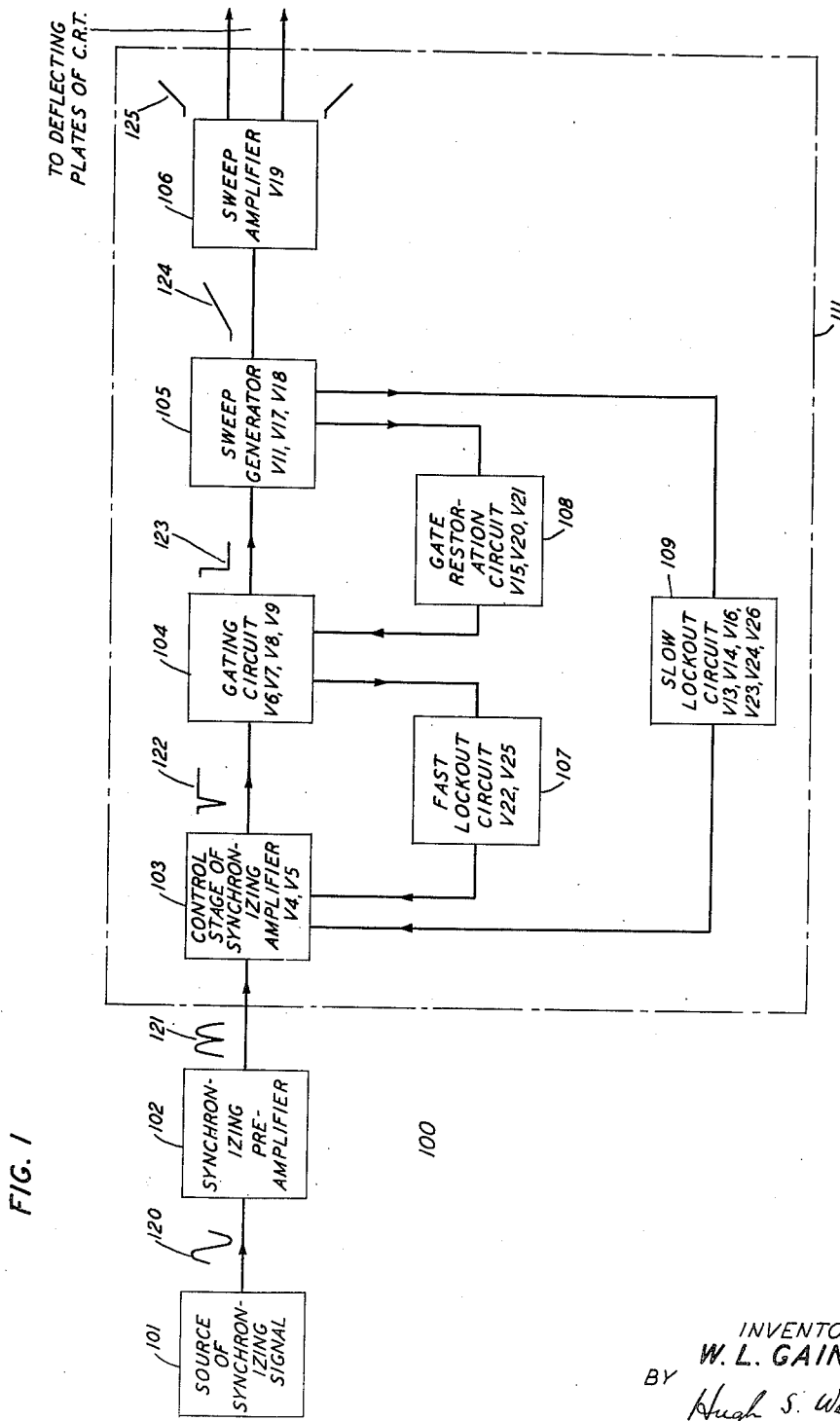

May 6, 1952　　W. L. GAINES　　2,595,667
SWEEP CIRCUIT
Filed Dec. 24, 1949　　2 SHEETS—SHEET 1

INVENTOR
W. L. GAINES
BY Hugh S. Wertz
ATTORNEY

May 6, 1952 — W. L. GAINES — 2,595,667
SWEEP CIRCUIT
Filed Dec. 24, 1949 — 2 SHEETS—SHEET 2

INVENTOR
W. L. GAINES
BY
Hugh S. Wertz
ATTORNEY

Patented May 6, 1952

2,595,667

UNITED STATES PATENT OFFICE 2,595,667

SWEEP CIRCUIT

Wilbur L. Gaines, Bayside, N. Y., assignor to Bell Telephone Laboratories, Incorporated, New York, N. Y., a corporation of New York Application December 24, 1949, Serial No. 134,932

8 Claims. (Cl. 315—23)

This invention relates to electric circuits and more specifically to circuits for producing sweep cycles of the non-recurring type.

Non-recurring sweep cycles consist basically of three parts—the sweeping, the restoration and the quiescent portions. The sweeping portion comprises the useful part of the cycle. It is initiated by a synchronizing signal and comprises a voltage varying unidirectionally until the peak is reached. The restoration portion follows and consists of the interval it takes for the sweep voltage to return from its peak to the normal or quiescent value. It represents the time it takes the sweep generator to be restored to its normal position ready for a new synchronizing signal. The quiescent portion is that interval after the sweep has been restored before a new sweeping portion has been initiated by another synchronizing signal.

The principal object of this invention is to improve the precision and efficiency of sweep circuits of this kind.

In precision sweep circuits, it is necessary to insure that after one synchronizing signal has tripped the sweep generator, no further signals can affect the sweep operation until the sweep cycle is completed. Hitherto, this had been done by keeping the synchronizing amplifier inoperative only during the time the sweep generator was being actuated. In measuring high frequency disturbances this had the disadvantage that a synchronizing signal might pass during the time of sweep restoration to retrip the sweep generator before the latter had been restored to its steady or quiescent state. In accordance with the invention, this problem is overcome by a circuit which continuously measures the sweep voltage and keeps the synchronizing amplifier inoperative until the sweep voltage has been restored to practically its quiescent value. Moreover, there is a further provision for keeping the synchronizing amplifier unresponsive for an additional adjustable interval after the sweep has been restored, so that undesirable synchronizing pulses can be made ineffective.

Another factor important in high frequency sweep circuits is the restoration time of the sweep generator. This represents a useless part of the sweep cycle and limits the speed of response of the system, so it is best kept at a minimum. In accordance with this invention, there is provided an arrangement for reducing this restoration time by means of an improved changing circuit for the sweep generator.

Another important problem in the use of sweep circuits with cathode-ray tubes is the stabilization of the starting point on the cathode-ray tube screen. With most present sweep circuit arrangements in which direct connection is made to the deflecting plates of the cathode-ray tube, further adjusting is necessary, whenever the sweep speed is varied, to keep the starting point on the tube screen at the same spot. Another feature of the present invention is a constant potential divider arrangement, a specific embodiment of which is used to maintain the stability of the zero spot as the sweep speed is varied.

Figure 2:
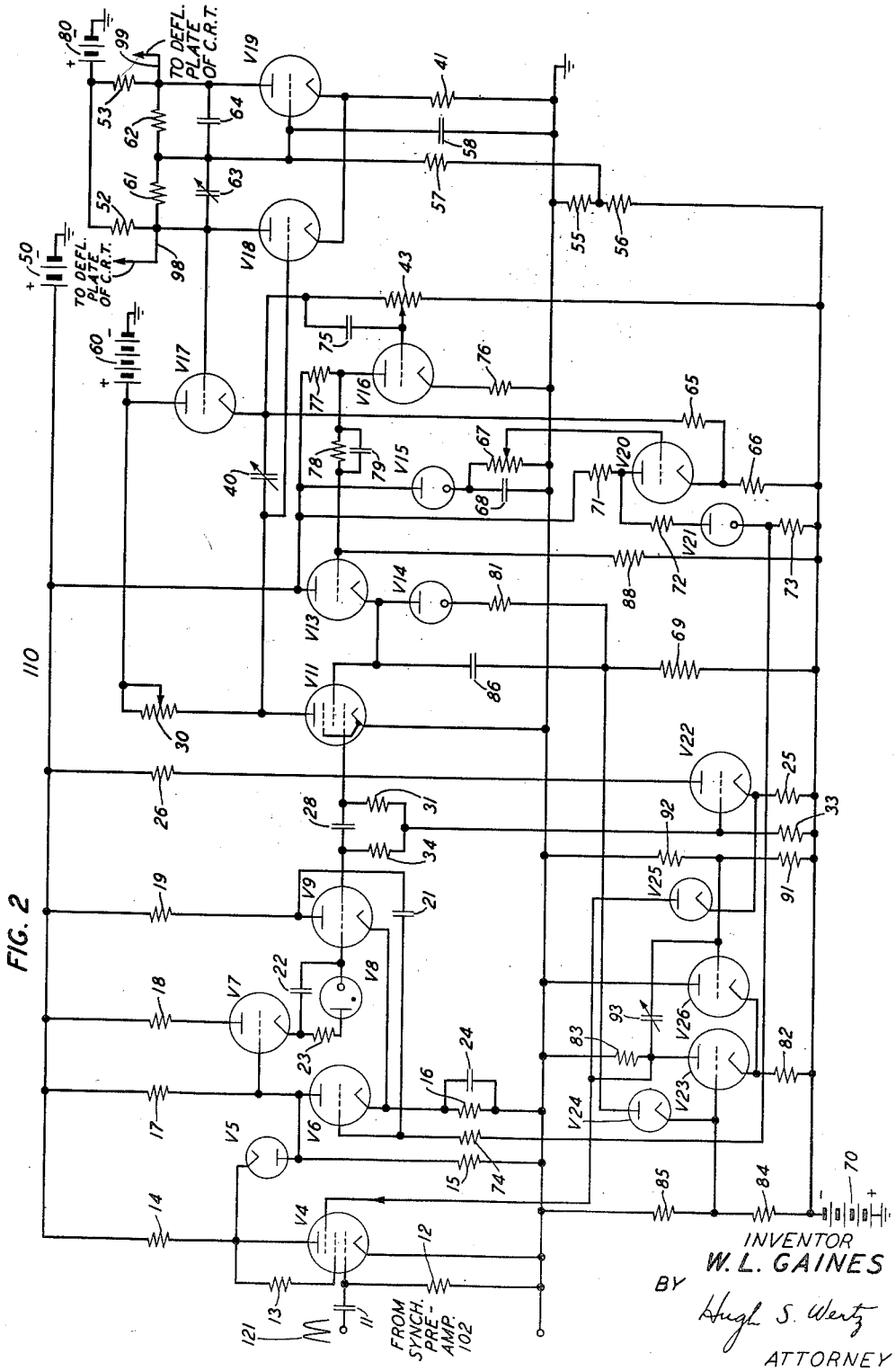

The invention will be more readily understood by referring to the following description taken in connection with the accompanying drawings forming a part thereof in which:

Fig. 1 is a block diagram showing the constituent elements of a sweep circuit in accordance with the invention; and Fig. 2 is a diagram of an illustrative circuit embodying the invention.

Referring more specifically to the drawings, Fig. 1 shows, by way of example for purposes of illustration and in block diagram form, a sweep circuit arrangement 100 in accordance with the invention. In this arrangement, a source of a synchronizing signal 101 supplies a signal 120 to the preamplifier 102 which amplifies, clips and reverses when necessary to insure a positive signal. The sharpened unidirectional pulses 121 are thereafter supplied to the control stage 103 of the synchronizing amplifier where all but the first are cut off by the action of a control element in a manner hereinafter to be described. This one pusle is further amplified and reversed to produce a sharp negative pulse 122. The pulse 122 is thereafter used to trip the gating circuit 104 which comprises a "flip-flop" circuit having two positions of stability, operating and non-operating. The output of the gating circuit 104 consists of a negative step pulse 123 which serves to control the sweep generator 105, and the output therefrom, the sweep voltage 124, is applied to the sweep amplifier 106. The amplifier 106 is of the kind well known in the art to give a balanced push-pull output 125 suitable for use with the deflection plates of a cathode-ray tube.

Precision of control is achieved by three separate feedback paths 107, 108 and 109. The first feedback path, the fast lock-out circuit 107, uses a portion of the gating circuit output 123 to keep the control stage 103 of the synchronizing amplifier cut off after the gating circuit 104 has been tripped. The first of the pulses 121 supplied by the synchronizing preamplifier 102, after reversal and amplification by the control stage 103, trips the gating circuit 104 to its operating position. A portion of the negative step voltage 123 produced is supplied back to a control element of the control stage 103, thereby cutting this stage off and preventing all but the first pulse from being amplified. This negative voltage is maintained on said control element until the gating circuit 104 is restored to its non-operating position. The second feedback path, the gate restoration circuit 108, measures the output of the sweep generator 105 and supplies the gating circuit 104 with the pulse needed for restoring it to its non-operating position when the sweep output 124 has reached a predetermined level. The third feedback path, the slow lock-out circuit 109, measures the sweep output 124 to keep the control stage 103 cut off until the sweep voltage 124 has been restored to its quiescent value.

Reference will now be made to Fig. 2 which is an illustrative diagram of a circuit 110 which is part of a specific embodiment in accordance with the invention. The circuit of Fig. 2 comprises the elements indicated within the enclosure 111 of Fig. 1.

The sharp unidirectional pulses 121 developed by the synchronizing preamplifier 102 are supplied to the grid of control tube V4 through coupling condenser 11 and the grid leak resistance 12. Tube V4 is operated as an amplifier. The cathode thereof is grounded, the screen grid voltage is supplied through resistances 13 and 14 from source 50, and the plate voltage is taken through resistance 14 from this same source. The suppressor grid, which serves as the aforementioned control element, is connected to the anode of tube V25 for a purpose hereinafter to be described. The anode of tube V4 is coupled to the grid of tube V7 through diode V5 which is correctly poled to pass only negative pulses. The plate voltage of tube V5 is supplied by tapping between resistances 15 and 17 which are across the source 50.

Tubes V6, V7, V8 and V9 form a non-free running multivibrator circuit with two positions of stability, which functions as the gating circuit 104. The cathodes of tubes V6 and V9 are connected together and then through a common resistance 16 and by-pass condenser 24 to ground. The plate voltages of tubes V6, V7 and V9 are supplied through resistances 17, 18 and 19, respectively, from source 50. The grid of tube V6 is connected to the anode of tube V9 through the coupling condenser 21, and the anode of tube V6 is connected to the grid of the cathode follower tube V7. The cathode of tube V7 is connected through resistance 23 and the voltage-dropping gas tube V8 to the grid of tube V9. The by-pass condenser 22 is shunted across the resistance 23 and the voltage-dropping gas tube V8.

Cathode follower V22 and diode V25 make up the fast lock-out circuit 107 which consists of a feedback path from the output of the multivibrator to the suppressor grid of the control tube V4 of the synchronizing amplifier. The control grid of the tube V9 is connected to the control grid of the tube V22 through resistance 34. Tube V22 has its cathode connected through the resistance 25 to the negative terminal of the source 70. The plate voltage thereof is supplied through resistance 26 from the positive terminal of source 50 and the grid bias by tapping the common terminal between resistances 33 and 34. The other terminal of resistance 33 is connected to the negative terminal of source 70. The cathode of tube V22 is connected to the suppressor grid of tube V4 through the blocking diode V25 which is correctly poled to pass only negative pulses.

The gating circuit output 123 also actuates the sweep generator 105. The sweep generator 105 includes tubes V11, V17 and V18. The grid of the tube V9 is connected through the coupling condenser 28 to the grid of the switching tube V11. The cathode and suppressor grid of tube V11 are grounded. The plate voltage of the tube V11 is supplied through the variable sweep resistance 30 from the positive terminal of the source 60. The negative grid bias voltage for tube V11 is supplied through resistances 31 and 33 from the negative terminal of source 70. The anode thereof is directly coupled to the grid of tube V18. The anode of the tube V18 is coupled directly to the grid of cathode follower tube V17 whose cathode is connected through the variable sweep condenser 40 back to the anode of tube V11. The cathode follower tube V17 has its plate voltage supplied from the source 60.

Tube V19 completes the sweep amplifier 106 and combines with the tube V18 to produce the balanced sweep output necessary for optimum cathode-ray tube operation. Tube V19 is an amplifying and inverting stage with unity gain whose output is combined with that of tube V18 to produce a balanced push-pull sweep voltage 125. The cathodes of tube V18 and tube V19 are connected through the common cathode resistance 41 to ground. The plate voltages thereof are supplied through resistances 52 and 53, respectively, from source 80. The grid of tube V19 is connected through resistance 57 between resistances 55 and 56 which form a voltage divider across the source 70. Condenser 58 is connected between the grid of tube V19 and ground. The grid of tube V19 is coupled to the anode of tube V18 through resistance 61 and the associated by-pass condenser 63. There is also a feedback path through resistance 62 and its associated by-pass condenser 64 from the anode of tube V19 to the grid thereof. The T-network comprising resistances 61, 62, and 57, and the condensers 63, 64, and 58 forms a feedback path from the anodes of tubes V18 and V19 to the grid of tube V19 to insure unity gain therefor so that a balanced sweep output 125 is developed at the anodes of tubes V18 and V19. The anodes of tubes V18 and V19 are connected, respectively, through terminals 98 and 99 to the two horizontal deflection plates of a cathode-ray tube.

Tubes V20, V21 and V15 form the gate restoration circuit 108 which measures the magnitude of the sweep voltage and thereafter, when the proper value has been reached, generates a pulse which restores the multivibrator to its non-operating position. A measure of the sweep voltage 124 is supplied to the cathode of tube V20 through resistance 65 from the cathode of tube V17. Resistance 66 completes the cathode circuit of tube V20 through to the negative terminal of the source 70. The grid bias of tube V20 is fixed by tapping across the potentiometer 67 which is in series with the voltage dropping gas tube V15 across the source 50. Condenser 68 is a high frequency shunt to ground across the resistance 67. The plate voltage of tube V20 is supplied through the resistance 71 from the source 50. The restoring pulse which is supplied to the grid of tube V6 of the multivibrator is obtained by tapping the divider, formed by the series circuit from the anode of tube V20 to the negative terminal of source 70, consisting of resistance 72, the gas tube V21 and the resistance 73, between the gas tube V21 and the resistance 73.

The slow lock-out circuit 109 comprises the tubes V16, V13, V14, V24, V23 and V26. A measure of the sweep voltage 124 is supplied to the grid of tube V16 by tapping on potentiometer 43 which is between the cathode of tube V17 and the negative terminal of the source 70. The cathode of tube V16 is grounded through the resistance 76. The plate voltage thereof is supplied through the resistance 77 from source 50. After amplification, the sweep voltage is fed from the plate of the tube V16 through resistance 78 to the grid of cathode follower tube V13. Condenser 79 serves as a high frequency shunt across resistance 78. Tube V13 derives its plate voltage from source 50. The grid thereof is connected to the common terminal of the divider formed by resistances 78 and 88. The resistance 88 is further connected to the negative terminal of the source 70. The sweep voltage is supplied from the cathode of tube V13 through the voltage dropping gas tube V14, resistance 81, blocking diode V24 to the grid of tube V23. Condenser 86 serves as a high frequency shunt across the resistance 81 and the tube V24. The resistance 69 is connected to the terminal between resistance 81 and condenser 86, and the negative terminal of source 70. The cathode of tube V13 is also connected to the screen grid of tube V11 which forms part of the zero stabilization circuit. Tube V23 has its cathode connected through the resistance 82 to the negative terminal of the source 70, and the plate thereof is grounded through the resistance 83. The grid bias therefor is obtained by connecting to the common point between resistances 84 and 85 which are connected across the source 70. The negative lock-out voltage developed on the plate of tube V23 is fed directly to the suppressor grid of tube V4. A prolongation of this lock-out pulse may be obtained by means of a "single-shot" multivibrator formed by the addition of tube V26. The anode thereof is connected to ground, and the grid to the common terminal of a divider formed by the resistances 91 and 92 connected across the source 70. The grid thereof is further connected through the variable condenser 93 to the anode of tube V23. The cathode thereof is connected to the cathode of tube V23.

The operation is as follows: Suppose, for purposes of illustration, that a synchronizing signal 120 is supplied to the input of the sweep circuit. The first of the sharp positive pulses 121 supplied by the preamplifier to the grid of V4 is further amplified and reversed by this last stage of the synchronizing amplifier. The sharpened negative pulse 122 is passed through diode V5, cathode follower V7, and gas tube V8 to the grid of tube V9. Tube V9 is that stage of the non-free running multivibrator which is normally conducting in the non-operating position. This sharp negative pulse tends to cut tube V9 off, and produces a sharp positive pulse on the anode thereof which is transmitted by way of coupling condenser 21 to the grid of tube V6 which hitherto has been non-conducting and tends to cause current flow to the anode of tube V6. This tendency is augmented by the negative drop across cathode resistance 16 which is common to tubes V6 and V9. The two effects act cumulatively so that tube V6 quickly becomes saturated while tube V9 is cut off. The circuit is stable in this operating position and will not return to its non-operating position until a restoring pulse is received. The cathode follower V7 is used to couple directly the plate of V6 to the grid of V9. This keeps to a minimum the input capacitance of tube V9 and insures the most rapid response. Gas tube V8 merely serves as a voltage bleeder to reduce the high cathode voltage of tube V7 to a value more suited for the grid of tube V9. The process is reversed when a negative restoring pulse is supplied to the grid of tube V6. Tube V6 tends to cut off, producing a positive pulse on the plate thereof which is transmitted through the cathode follower V7 and the gas tube V8 to the grid of tube V9, and tends to make tube V9 conducting. As before, the effect of the common cathode resistance 16 is to make the action cumulative and tube V6 is quickly cut off and tube V9 draws current.

The negative step pulse 123 developed on the anode of tube V6 when the gating circuit is first tripped, is used to control the sweep generator 105 and also is transmitted through the tubes V22 and V25 to provide a control voltage to tube V4 of the synchronizing amplifier. This makes up what was designated the fast lock-out circuit 107. The negative pulse on the anode of tube V6 is passed through the cathode follower V7, resistance 23, gas tube V8 and resistance 34 to the grid of tube V22. Since tube V22 is used as a cathode follower, the negative pulse is continued along through the diode V25 to the suppressor grid of the tube V4. Diode V25 is a blocking diode and serves to isolate the suppressor grid of the tube V4 from all but negative pulses. The negative voltage on the suppressor grid cuts off tube V4 and makes the synchronizing amplifier unresponsive to further synchronizing signals while the gating circuit 104 is operated. The suppressor grid is kept at a negative potential so long as the tube V6 remains in a conducting state.

The negative pulse on tube V6 simultaneously actuates the sweep generator 105 and starts it on the sweeping portion of the sweep cycle. Tube V11 is normally conducting while the gating circuit 104 is in its non-operating position. However, the sharp negative step voltage 123 produced on the anode of the tube V6 as the gating circuit is tripped, is transmitted through the cathode follower V7 and the coupling condenser 28 to the grid of tube V11. This step voltage cuts off the tube V11, and the voltage at the anode thereof tends to rise. Since this anode is connected directly to the grid of the tube V18, this positive voltage tends to cause an increase in the plate current of tube V18 which decreases the voltage at the anode thereof. This negative change is returned through the cathode follower V17 and the sweep condenser 40 to the anode of the tube V11. Hence, it may be seen that this negative feedback will tend to keep the voltage on the anode of tube V11 constant. This means that the voltage drop across sweep resistance 30 is held substantially constant so that there is a substantially constant current flow therethrough. The only path available for this current is through the sweep condenser 40 which is thus discharged by a constant current. This causes a voltage change which is linear with time across this condenser 40. Substantially all of this voltage will appear on the plate of tube V18 forming one half of the sweep voltage. Tube V19 is an amplifying and inverting stage with unity gain whose output is combined with that of tube V18 to produce a balanced push-pull output 125. The sweep voltage on the anode of tube V18 is fed through coupling resistance 61 to the grid of tube V19 and produces an opposite voltage on the anode of tube V19. The negative feedback from the anode of tube V19 through resistance 62 back to the grid of tube V19 is adjusted to provide unity gain for tube V19 and insure a balanced push-pull output. Condensers 58, 63 and 64 operate in like manner to form a dynamic feedback path.

As was hereinabove mentioned, the multivibrator is of the kind having two positions of stability. Once tripped, it continues in an operating position until restored. The restoration circuit 108 measures the sweep voltage 124 and, after a predetermined level which is adjusted to insure the optimum length of the sweep has been reached, supplies the necessary restoring pulse to the gating circuit 104 which cuts off the sweeping portion of the cycle and restores the sweep voltage to its quiescent value. Tube V20 is ordinarily non-conducting, being biased past cut-off. However, the cathode thereof is connected through resistance 65 to one terminal of the sweep condenser 40. As condenser 40 discharges during the sweeping portion of the cycle, the voltage on the cathode of tube V20 decreases and eventually tube V20 conducts. The point at which it starts to conduct determines the end of the sweeping portion and is adjusted by means of the bias on the grid of V20. This bias may be changed by varying the tap on potentiometer 67. When tube V20 begins to conduct, a negative pulse is generated at the anode thereof which is transmitted through resistance 72, gas tube V21, and resistance 74 to the grid of the tube V6. Gas tube V21 serves to drop the high plate voltage of tube V20 to a value suitable for use on the grid of tube V6. The negative pulse thus supplied to the grid of the tube V6 initiates the action which restores the multivibrator to its non-operating position in the manner already discussed. As the gating circuit 104 is restored to its non-operating position, the anode of tube V6 receives a positive pulse which is transmitted as hitherto described to the grid of the switching tube V11 which is thereby rendered conducting and recharges sweep condenser 40. This change in the plate voltage of tube V6 is also transmitted through the fast lock-out circuit 107 and removes the negative pulse on the suppressor grid of the tube V4 which has kept the synchronizing amplifier inoperative to insure that no further tripping pulses would pass to affect the multivibrator.

Since the restoration of the sweep condenser to its normal or quiescent voltage takes a finite time, for the greatest precision it is necessary to protect the multivibrator from retripping until the sweep condenser is fully restored. In accordance with the invention, this is done by the slow lock-out circuit 109. The sweep voltage 124 is measured by the action of tube V16. The grid of tube V16 is biased close to cut-off. As the sweep condenser 40 begins to discharge, marking the start of the sweep cycle, the negative change thereacross is transmitted through the tap on resistance 43 to the grid of the tube V16, cutting it off. This causes a positive change on the anode of tube V16 which is transmitted through resistance 78, through the cathode follower V13, gas tube V14, resistance 81 and blocking diode V24 to the grid of the tube V23. Tube V23 amplifies and reverses this pulse. This negative pulse is then supplied to the suppressor grid of the tube V4 and keeps the synchronizing amplifier cut off. The pulse is also used to trip a single position multivibrator which is formed by tubes V23 and V26 and is adapted to keep the tube V4 cut off for an additional interval, determined by the variable condenser 93, after the negative pulse has been removed. The negative pulse is maintained on the suppresor grid as long as the tube V16 is cut off, which is as long as the voltage across the sweep condenser differs measurably from its normal quiescent value.

Another feature of the invention is the improvement which results in the faster restoration of the sweep condenser to its quiescent value, after the sweeping portion of the cycle has been completed. As was hereinabove discussed, during the sweeping portion the switching tube V11 is cut off. Also, after the sweep begins, the tube V16 is cut off. As a result thereof, the anode voltage of tube V16 rises to its maximum positive value. Since the anode thereof is connected to the grid of the cathode follower V13, the cathode voltage of tube V13, which is supplied directly as the screen voltage of the tube V11, is also at a maximum. Hence, during the sweeping portion, the screen voltage thereof is at its maximum. Since tube V11 is then biased beyound cut-off, no screen current is drawn despite the high screen grid potential so that it is safe to operate at screen voltages higher than ordinarily permissible consistent with long tube life and reliable operation. When the positive pulse is received on the grid of the tube V11 ending the sweeping portion of the cycle and commencing the return to the quiescent state, the high screen voltage present at that time insures the maximum plate current. The higher the plate current, the less is the restoration time. More concisely, the high screen voltage minimizes the resistance of tube V11 which is in series with the charging circuit of the sweep condenser 40. The lower the series resistance, the faster the charging of the condenser 40.

This same feedback circuit to the screen grid of tube V11 also serves to stabilize the zero spot on the cathode-ray tube screen which is another feature of the invention. The zero position on the tube screen is determined by the steady anode voltages of tubes V18 and V19 since the anodes thereof are connected directly to the deflecting plates at terminals 98 and 99. These, in turn, are determined by the voltages on the grids of tubes V18 and V19 which are equal to that on the anode of tube V11. Since the sweep speed is varied by adjusting the sweep resistance 30, which is part of the plate load resistance of the tube V11, any variation thereof tends to change the plate voltage. Since the zero spot is very sensitive to changes in the plate voltage of tube V11, it is necessary to stabilize this voltage against fluctuations caused by variations in the plate load. Otherwise, it would become necessary to readjust the zero spot each time the sweep speed was changed, which would be a source of much inconvenience. For the purpose of illustration, suppose that the sweep resistance 30 is reduced tending to cause an increase in the plate voltage of tube V11. This is transferred to the grid of the tube V18 and decreases the plate voltage thereof. This negative pulse is fed through the cathode follower V17 and the voltage divider consisting of resistances 42, 43 and 44 to the grid of tube V16. This change is amplified, reversed in phase, and applied through the cathode follower V13 to the screen grid of tube V11. Thus, a positive change of voltage at the anode of the tube V11 will cause an increase in the screen grid voltage thereof. This effects a decrease in the tube impedance. The latter effect tends to restore the plate voltage to its original value. More concisely, resistance 30 and the impedance of tube V11 form a voltage divider which is tapped to supply the grid voltage of the tube V18. As the resistance 30 is decreased, the tube impedance must be decreased to maintain the voltage at the tap constant. This is done by a feedback circuit which varies the tube impedance in the same direction as the load is changed. This technique may be used apart from sweep circuits as a voltage-divider stabilizing circuit.

It is to be understood that the above-described arrangements are illustrative of the principles of the invention. Numerous other arrangements may be devised by those skilled in the art without departing from the spirit and scope of the invention.

What is claimed is:

1. A circuit for producing sweep voltages each cycle of which includes a sweeping portion followed in turn by a return portion and a quiescent portion during which the sweep voltage has a substantially constant value, comprising means for receiving synchronizing signals, an amplifier for said synchronizing signals, means connected to said amplifier for producing step voltages, each of which has an abrupt forward part, means initiated by said forward part of each step voltage for producing the sweeping portion of a sweep voltage cycle, means rendered active when a predetermined point on said sweeping portion of the sweep voltage has been reached for terminating the step voltage and in turn said sweeping portion of the sweep voltage, means initiated by the termination of said step voltage for causing said sweep voltage to return abruptly to its quiescent state, and means for rendering inactive the synchronizing amplifier on the occurrence of the forward part of said step voltage and for maintaining it inactive for a predetermined time after the sweep voltage has been returned to its quiescent state.

2. A circuit for producing sweep voltages according to claim 1, and characterized in that the amplifier for the synchronizing signal includes a control element, and further characterized in that the means for rendering inactive the synchronizing amplifier on the occurrence of the forward part of the step voltage includes means for returning a portion of said step voltage to said control element and the means for maintaining the amplifier inactive for a predetermined time after the sweep voltage has been returned to its quiescent state includes means for returning a portion of said sweep voltage to the control element.

3. A sweep circuit according to claim 1 characterized in that the means initiated by the termination of the step voltage for causing the sweep voltage to return abruptly to its quiescent state includes an electron discharge device having a cathode, a control grid, a plate and a screen grid element, means for raising the screen grid potential during the sweeping portion of the sweep voltage, and means for reducing it during the return portion, whereby this return interval is minimized.

4. A sweep circuit comprising a space current device having a cathode, a control grid, a screen grid, and a plate element, means connected to said space current device for rendering it non-conducting, means in series with the plate element for producing the sweeping portion of a sweep voltage cycle as said space current device is rendered non-conducting and in turn for raising the potential on the screen grid element, means rendered active for making the space current device conducting after the sweep voltage has progressed for a predetermined interval, and means for reducing the screen grid potential as the space current device becomes conducting.

5. In a sweep circuit for use with a cathode-ray tube, an arrangement for stabilizing the starting point of the sweep image on the cathode-ray tube screen as the sweep speed is varied comprising a space current device having a plate, a cathode, a first control element, and a second control element, a current path associated with said plate which includes a plate load resistance which is varied to change the sweep speed, means for using the plate voltage to fix the starting point of the sweep image on the tube screen, and means for keeping the plate voltage constant as the plate load is varied, said means comprising a feedback circuit from the plate to the second control element.

6. A circuit for producing sweep voltages, each cycle of which includes a sweeping portion followed in turn by a return portion and a quiescent portion, comprising means for producing a step voltage having an abrupt forward and an abrupt return part, a first electron discharge device having a plurality of elements, including a cathode, a first control element, a second control element and a plate, a second electron discharge device having a plate, a cathode and a control element, a third electron discharge element having a plate, a cathode and a control element, means for supplying said step voltage to the cathode element of said first electron device, a resistance in series with the plate of the first electron device, a condenser connected between the plate of the first electron device and the cathode of the third electron device, means connecting the plate of the first electron device with the first control element of the second electron device, means connecting the plate of the second electron device to the control element of the third, and means connecting the cathode of the third electron device to the second control element of the first electron device.

7. A circuit for producing sweep voltages according to claim 1 and characterized in that the sweep generator includes means for adjusting the rate of change of the sweeping portion of the sweep cycle, and means for keeping constant the quiescent portion of the sweep cycle as the sweep rate is varied.

8. A circuit for producing sweep voltages each cycle of which includes a sweeping portion followed in turn by a return portion and a quiescent portion during which the sweep voltage has a substantially constant value, comprising means for receiving synchronizing signals, means connected to said amplifier for producing step voltages, each of which has an abrupt forward part, means initiated by said forward part of each step voltage for producing the sweeping portion of a sweep voltage cycle, means for varying the rate of change of said sweeping portion, means rendered active when a predetermined point on said sweeping portion has been reached for terminating the step voltage and in turn said sweeping portion, means initiated by the termination of said step voltage for causing said sweep voltage to return abruptly to its quiescent state, and means for keeping constant this quiescent state as the sweep rate of change is varied.

WILBUR L. GAINES.

REFERENCES CITED

The following references are of record in the file of this patent:

UNITED STATES PATENTS

| Number | Name | Date |
|---|---|---|
| 2,075,966 | Vance | Apr. 6, 1937 |
| 2,171,614 | Wendt | Sept. 5, 1939 |
| 2,415,870 | De Ryder | Feb. 18, 1947 |
| 2,449,848 | Hefele | Sept. 21, 1948 |
| 2,466,924 | Bradford et al. | Apr. 12, 1949 |